(12) United States Patent
Parker

(10) Patent No.: US 6,668,960 B1
(45) Date of Patent: Dec. 30, 2003

(54) AIRBAG SUSPENSION SYSTEM FOR MOTORCYCLES

(76) Inventor: Timothy Eugene Parker, 3207 Edward Ave., Santa Clara, CA (US) 95054

( * ) Notice: Subject to any disclaimer, the term of this patent is extended or adjusted under 35 U.S.C. 154(b) by 0 days.

(21) Appl. No.: 10/236,641

(22) Filed: Sep. 6, 2002

(51) Int. Cl.[7] .............................................. B62D 61/02
(52) U.S. Cl. ..................................... 180/227; 280/284
(58) Field of Search ................................. 180/219, 227; 280/124.157, 124.158, 124.177, 275, 283–286

(56) References Cited

U.S. PATENT DOCUMENTS

| | | | |
|---|---|---|---|
| 5,839,536 A | * 11/1998 | Tanaka | 180/227 |
| 6,003,628 A | 12/1999 | Jurrens | 180/227 |
| 6,123,165 A | * 9/2000 | Smith | 180/227 |
| 6,193,005 B1 | 2/2001 | Jurrens | |
| 6,357,546 B1 | 3/2002 | Crosby | |

* cited by examiner

*Primary Examiner*—Lesley D. Morris
*Assistant Examiner*—L. Lum

(57) ABSTRACT

A The airbag suspension system of the invention replaces the stock coil-over shock. The system provides (i) an airbag disposed in essentially the same location as the stock coil-over shock being held in place by an upper airbag mount that attaches to the rear of the motorcycle main frame and a lower airbag mount that attaches to the swingarm; (ii) a shock absorber mounted to the upper airbag mount and to the swingarm via a progressive relay arm linkage similar to the linkage used in modern sportbike suspension; and (iii) an onboard air compressor and switching unit that allows the motorcycle operator to adjust the pressure to the air bag suspension system while the motorcycle is stationary or in motion.

21 Claims, 5 Drawing Sheets

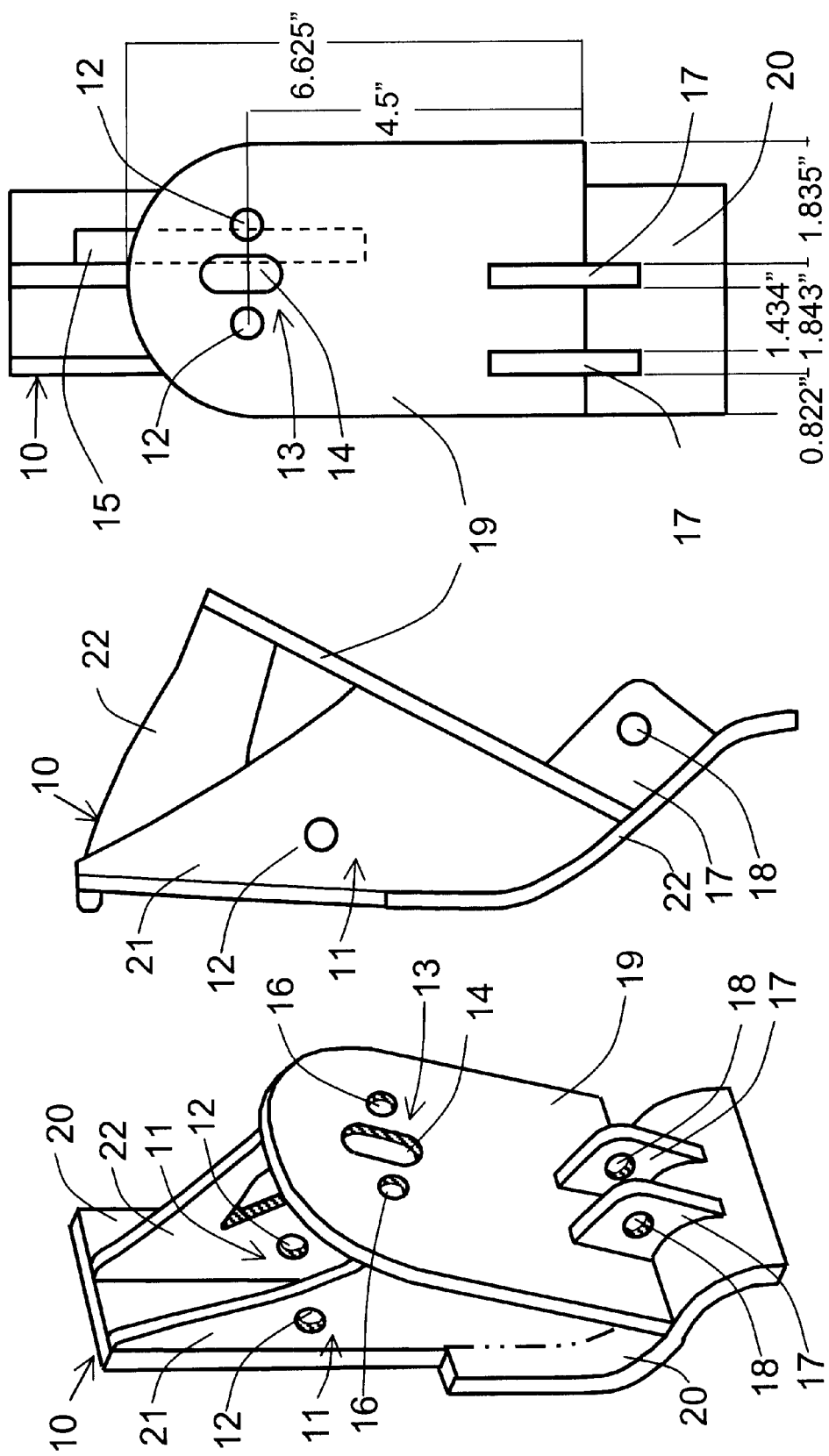

Main Frame group
1. Main frame assembly
2. Main frame vertical member
3. Main frame swingarm mount
4. Main frame shock absorber mount
5. Main frame relay arm mount Swingarm group
6. Swingarm assembly
7. Swingarm vertical member
8. Swingarm main frame mount
9. Swingarm tie-rod attachment sites Upper airbag mount group
10. Upper airbag mount
11. Upper airbag mount frame attachment site
12. Upper airbag mount frame attachment site holes
13. Upper airbag mount airbag attachment site
14. Upper airbag mount airbag inlet fitting hole
15. Upper airbag mount frame attachment site opening
16. Upper airbag mount airbag attachment site holes
17. Upper airbag mount shock absorber attachment site
18. Upper airbag mount shock absorber attachment site holes
19. Upper airbag mount first plate
20. Upper airbag mount second plate
21. Upper airbag mount first vertical member
22. Upper airbag mount second vertical member Lower airbag mount group
23. Lower airbag mount
24. Lower airbag mount swingarm attachment site
25. Lower airbag mount airbag attachment site
26. Lower airbag mount interior member
27. Lower airbag mount airbag attachment site holes
28. Lower airbag mount plate
29. Lower airbag mount first vertical member
30. Lower airbag mount second vertical member
31. Lower airbag mount access hole
32. Lower airbag mount central vertical member Relay arm group
33. Left tie-rod
34. Right tie-rod
35. Relay arm
36. Relay arm frame attachment site
37. Relay arm shock absorber attachment site
38. Relay arm tie-rod attachment site Airbag group
39. Airbag
40. Airbag inlet fitting
41. Airbag upper airbag mount attachment site
42. Airbag upper airbag mount attachment site studs
43. Airbag lower airbag mount attachment site
44. Airbag lower airbag mount attachment site studs Shock absorber group
45. Shock absorber
46. Shock absorber upper mount
47. Shock absorber lower mount Peripheral component group
48. Air compressor
49. Air hose
50. Pressure reservoir
51. Solenoid(s)
52. Battery

FIG. 7

AIRBAG SUSPENSION SYSTEM FOR MOTORCYCLES

FIELD OF THE INVENTION

The invention relates to an airbag rear suspension system for motorcycles. The invention allows a motorcycle operator to adjust the ride height of a motorcycle by varying the pressure in an airbag that replaces the stock coil-over shock absorber mechanism, providing substantial ride height adjustment for motorcycles equipped with modem swingarm-type rear suspension. The airbag suspension system is useful, for example, for touring motorcycles, which perform under a wide range of passenger and cargo loads, and for cruisers and show bikes, which are often raised or lowered for cosmetic reasons.

BACKGROUND OF THE INVENTION

The combination of an internal combustion engine with a bicycle frame gave rise to the motorcycle around the turn of the $20^{th}$ century. Initially, pneumatic tires and sprung saddles provided the only insulation from unwanted road vibrations. As motorcycle horsepower and speed increased, some form of front suspension soon became essential not only for rider comfort but for maintaining effective wheel-to-road surface contact. By comparison, motorcycle rear suspension was adopted slowly, particularly among American-based motorcycle manufacturers such as Harley-Davidson and Indian. To this day, "hardtail" frames (i.e., frames that accept a rear wheel directly without the imposition of a suspension mechanism) are commonly used as the basis for custom "choppers," usually comprising Harley-Davidson drivetrains.

By the late 1950s, telescopic front forks and twin-shock absorber, swingarm-type rear suspension had become fairly standard on British and European motorcycles. In fact, the Norton "Featherbed" frame, fitted with a tubular steel swingarm (along with ROADHOLDER® forks), is still highly sought after as the basis for custom "café racers" and Tritons (hybrid motorcycles with Norton frames and Triumph engines).

Since the mid-1980s, single rear shock absorbers have largely replaced twin rear shocks, especially on high-performance motorcycles. Single large shock units generally offer superior performance and greater adjustability than two relatively small shocks. Perhaps largely as a consequence of having to mount the single shock near the pivot-point of the swingarm to avoid interference with the rear wheel, most modern swingarm rear suspension designs incorporate a relay arm through which the shock is connected to the swingarm. The relay arm amplifies the travel of the swingarm, often in a progressive manner, allowing the use of lighter coil springs and avoiding the undesirable situation where a shock absorber must dampen the action of a heavy spring while operating within a short range of travel.

Modern rear shock absorbers, particularly aftermarket performance shocks, are frequently adjustable for spring preload, compression damping, and rebound damping. In some cases, ride height is also adjustable but usually involves detaching the bottom end of the shock from the relay arm to either elongate the shock absorber or adjust the height of the bottom shock mounting point. This type of adjustment requires that the rear wheel be completely unloaded and is not readily performed without appropriate lifting equipment and mechanical aptitude. Moreover, most motorcycle suspensions are not adjustable for ride height.

Many modern cruisers and touring motorcycles feature single-shock, swingarm rear suspension. Since these motorcycles are routinely ridden for long distances, over variable road surfaces, and are often fully loaded with a passenger and gear, the ability to quickly and easily vary ride height is particularly desirable. To this end, the airbag suspension system of the instant invention allows a motorcycle operator to adjust ride height to accommodate different loads, to change the handling characteristics of the motorcycle, or to alter the appearance of the motorcycle.

Motorcycle airbag rear suspensions have been described in U.S. Pat. No. 6,003,628 (Dec. 21, 1999; herein the '628 patent), U.S. Pat. No. 6,193,005; (Feb. 27, 2001 herein the '005 patent), and U.S. Pat. No. 6,357,546 (Mar. 19, 2002; herein the '546 patent); however, these suspension systems are specifically designed for Harley-Davidson SOFTAIL® rear suspension. The SOFTAIL® frame and swingarm are designed to mimic the appearance of traditional Harley-Davidson hardtail frames. As a result of design constraints imposed by the desire to conceal the rear suspension mechanism, the SOFTAIL® suspension system utilizes an unusual spring and shock absorber arrangement wherein a pair of coil-over shocks are positions under the frame in front of the swingarm. Unlike the shock absorber assemblies of virtually all other motorcycles which compress when the swingarm rises (i.e., the suspension compresses), the SOFTAIL® coil-over shock units extent when the swingarm rises.

As a consequence of this unorthodox design, airbag devices are not readily compatible with the SOFTAIL® suspension system. Accordingly, an essential element of the '628 and '005 suspension systems is an elaborate sliding housing mechanism that translates the extending or pulling motion of the SOFTAIL® suspension into a compressing or pushing motion. In contrast, the airbag component of the instant invention is positioned within the included angle of the rear suspension where it is properly situated to be compressed in response to a rising swingarm.

The airbag suspension system described in the '546 patent also features a device to translate the extending or pulling motion of the SOFTAIL® suspension to a compressing motion for use with an airbag devise. In this case, the invention comprises a pair of pivotally connected plates that share a common pivot axis with the stock SOFTAIL® swingarm and main frame. The lower section of one plate connects to a shock absorber mounted in the conventional SOFTAIL® shock location. The upper part of the pivoting plates accept an airbag, essentially extending the SOFTAIL® suspension above the swingarm-frame axis to resemble a more modern swingarm suspension system.

The pivoting plate and airbag assembly of the '546 patent is not applicable to a modern swingarm suspension system that already comprises a mechanism for compressing a spring (or an airbag device). Moreover, there is usually no free space to insert an additional pivoting device between the swingarm pivot points (refer to FIG. 1), particularly on motorcycles that feature swingarms comprising single-piece, lateral box section members that house both sets of swingarm bushings or bearings. For these and other reasons, the suspension systems of the '546, '628, and '005 patents are narrowly tailored to suit the unorthodox SOFTAIL® suspension system.

The instant invention satisfies a need in the field of motorcycling by providing an airbag suspension system that can be fitted to motorcycles with modem swingarm-type rear suspension. The airbag suspension system of the invention provides adjustable ride height for varying loads, for rider and passenger comfort, or for appearances, with ride height being adjustable while the motorcycle is in motion.

SUMMARY OF THE INVENTION

The instant invention is drawn to an airbag suspension system for motorcycles having a main frame and a swingarm-mounted rear wheel. In the most simple embodiment of the invention, the airbag suspension system comprises:

a) an upper airbag mount having a main frame attachment site, an upper airbag attachment site, and a shock mounting site, the upper airbag mount being attached to the main frame at the main frame attachment site, b) a lower airbag mount having a swingarm attachment site and a lower airbag attachment site, the lower airbag mount being attached to the swingarm at the swingarm attachment site, c) an inflatable airbag having a longitudinal axis along which the airbag changes length upon inflation, and having an airbag mount attachment site at each end of the longitudinal axis, the airbag being attached to the upper airbag attachment site and the lower airbag attachment site;

d) a relay arm having a main frame attachment site at a first end, a shock absorber attachment site at a second end, and a tie-rod attachment site between the first and second ends, the relay arm being pivotally attached to a relay arm mounting site on the main frame, e) the relay arm additionally pivotally attached at the shock absorber attachment site to a first end of a shock absorber, f) a second end of the shock absorber being pivotally attached to the upper airbag mount shock mounting site, g) the relay arm being additionally pivotally attached at the tie-rod attachment site to a first end of at least one tie-rod, h) a second end of the tie-rod being pivotally attached to a tie-rod mounting site on the swingarm.

In a preferred embodiment of the invention, the upper airbag mount is fixedly attached to the main frame at the main frame attachment site. In another embodiment of the invention, the upper airbag mount is pivotally attached to the main frame at the main frame attachment site. In yet another embodiment of the invention, the upper airbag mount comprises multiple frame attachment sites. The upper airbag mount may be attached to the main frame by one or more methods, including but not limited to bolts, welds, and rivets. In a preferred embodiment of the invention, the upper airbag mount attaches to the stock shock absorber mount on the main frame.

In a preferred embodiment of the invention, the lower airbag mount is fixedly attached to the swingarm at the swingarm attachment site. In another embodiment of the invention, the lower airbag mount comprises multiple swingarm attachment sites. In a preferred embodiment of the invention, the lower airbag mount attaches to a box section near the center of the swingarm. In one embodiment of the invention, the lower airbag mount is held in place by the weight of the motorcycle. In another embodiment, the lower airbag mount is attached by one or more methods, including but not limited to bolts, welds, and rivets. In yet another embodiment of the invention, the lower airbag mount attaches to one or more stock tie-rod attachment points on the swingarm and the lower airbag mount comprises one or more alternative tie-rod attachment points.

In a preferred embodiment of the invention, the airbag suspension system comprises two tie-rods pivotally connecting the swingarm to the relay arm. In another preferred embodiment, the stock tie-rods are used.

In another embodiment of the invention, the relay arm is oriented so as to translate constant upward arcuate swingarm motion into progressively increasing linear shock absorber compression motion, thereby providing a progressive shock absorber linkage. In another embodiment, the airbag suspension system comprises an externally adjustable shock absorber. In a further embodiment, the airbag suspension system comprises a coil-over spring shock absorber.

In another embodiment of the invention the airbag suspension system provides at least one adjustment for the baseline ride height of the motorcycle. In a preferred embodiment, the adjustment is built-in to at least one of the airbag mounting sites.

In one embodiment of the invention, the airbag suspension system comprises an air compressor functionally connected to the airbag. In a preferred embodiment, the air compressor is functionally connected to the electrical charging system of the motorcycle and can be operated by a switch mounted on the motorcycle. In another embodiment, the invention further comprises a solenoid valve that allows the release of pressure in the airbag. In a preferred embodiment, the solenoid valve is functionally connected to the electrical charging system of the motorcycle and can be operated by a switch mounted on the motorcycle. In another preferred embodiment, the invention further comprises a consolidated switch assembly that allows the operator to increase and decrease air pressure to the airbag suspension system. In a most preferred embodiment, the consolidated switch assembly is handlebar-mounted. In another embodiment, the switch assembly is dashboard-mounted.

In another embodiment of the invention, the compressor is functionally connected to a pressure reservoir (e.g., a compressed air cylinder) that is functionally connected to the airbag through a second solenoid valve. In a preferred embodiment, the second solenoid valve is operated by a switch or a consolidated switch assembly mounted to the handlebar or dashboard. In another preferred embodiment, a pressure switch monitors the pressure in the reservoir and automatically operates the compressor so as maintain constant predetermined air pressure in the reservoir.

In another embodiment of the invention, the airbag suspension system further comprises an air pressure gauge functionally connected to the airbag suspension system. In a preferred embodiment of the invention, a microprocessor monitors the pressure in the airbag suspension system and alerts the operator of the motorcycle to sudden changes in the air pressure. In yet another embodiment of the invention, the microprocessor monitors the ride of the motorcycle and adjusts the air pressure in the airbag to maintain a preset ride height.

BRIEF DESCRIPTION OF THE DRAWINGS

FIG. 3 depicts a preferred embodiment of the upper airbag mount (¾-view)

FIG. 4 depicts a preferred embodiment of the upper airbag mount (side-view)

FIG. 5 depicts a preferred embodiment of the upper airbag mount (front-view)

FIG. 7 depicts a parts list for an embodiment of the invention

DESCRIPTION OF THE INVENTION

A) Definitions

Figure 1:
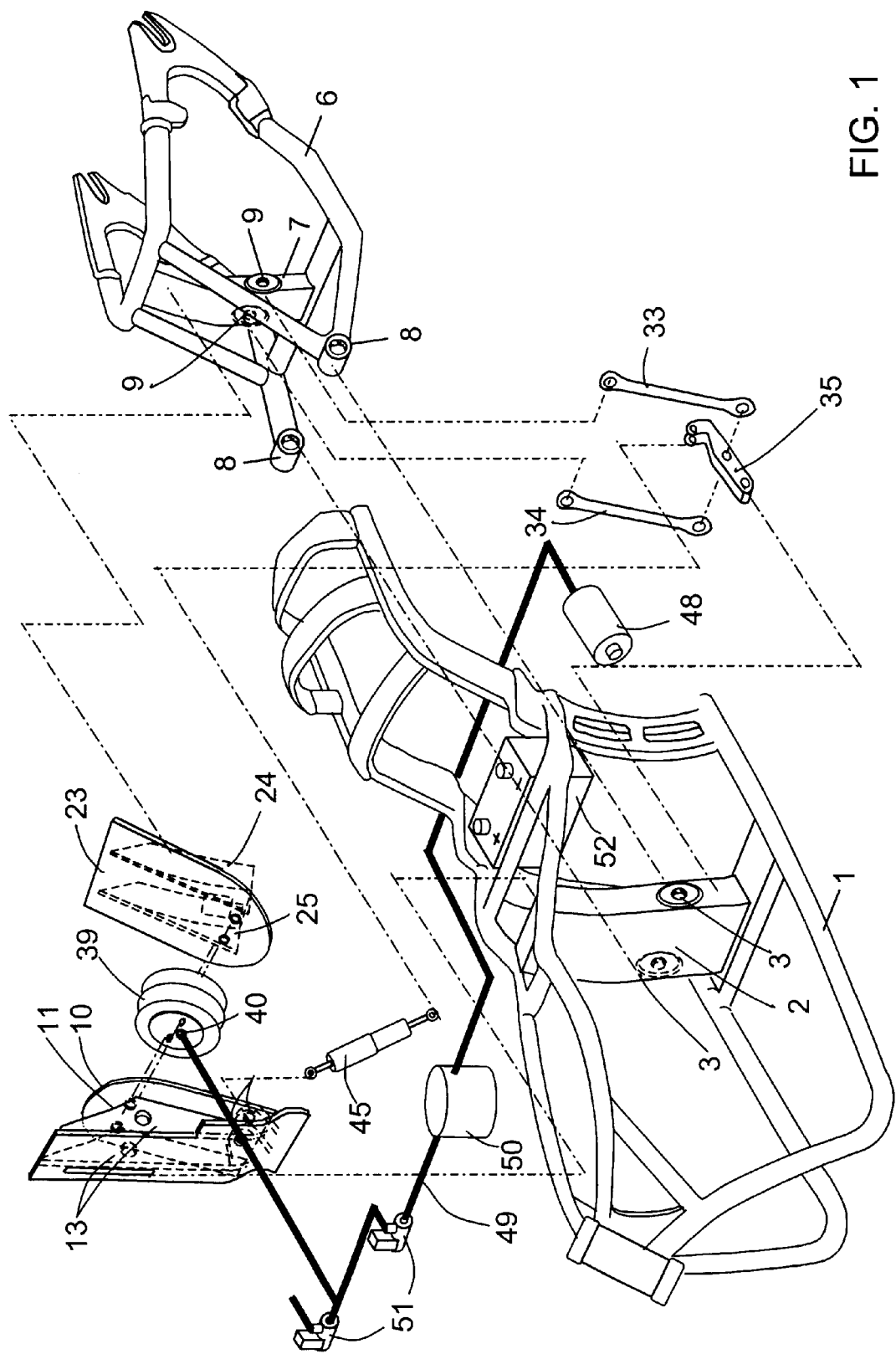
FIG. 1 depicts an exploded view of the airbag rear suspension system

Airbag: an inflatable bag constructed from an elastomeric material and capable of maintaining air pressure.

Baseline ride height: motorcycle ride height at the minimum inflation pressure of the airbag suspension system. Baseline ride height establishes the potential range of suspension travel that can be achieved through variation of the airbag pressure.

Cruiser: a motorcycle designed to accentuate styling features over functional features. Frequently the product of extensive customization to reflect individual tastes.

Dog bones: see relay arm, below.

High-performance motorcycle: A motorcycle designed for road handling and usually equipped with high quality suspension components. Synonym: sport bike.

Main frame: the portion of a motorcycle frame to which the front forks, engine, and swingarm are typically mounted. The main frame is frequently bolted or welded to a front subframe that supports, e.g., a headlight, dashboard, or fairing and may be additionally or optionally bolted or welded to a rear subframe that supports, e.g., a saddle, passenger footpegs, and exhaust mufflers.

Monoshock: a suspension arrangement which utilizes a single rear shock absorber, usually located between the rear wheel and the main frame.

Preload: load applied to a spring that is independent of the weight of the motorcycle. Preload adjustments place a spring under tension before an external force (e.g., the weight of the motorcycle) is applied.

Progressive link: a device such as a relay arm, that causes the rate of travel of the shock absorber to accelerate as the swingarm approaches the end of its range of upward travel.

Rebound damping: resistance to rapid extension of the suspension following compression.

Relay arm: a mechanical lever-device pivotally attached to the main frame, usually beneath the swingarm. The relay arm translates, via the tie-rods, the motion of the swingarm to the shock absorber. Synonym: rocker arm, dog bone.

Ride height: distance between a fixed point on the rear of a motorcycle and the pavement. Ride height is primarily determined by the angle between the swingarm and the main frame.

Rocker arm: see relay arm, above.

Shock absorber: (or "shock") a mechanical damping device used to attenuate the rate of suspension travel. Shock absorbers are frequently externally adjustable for damping characteristics. Generally, longer shock travel correlates with superior damping characteristics.

Single-sided swingarm: a swingarm that comprises a single tubular, box, or cast section parallel to one side of the rear wheel.

Swingarm: a tubular or box-section assembly pivotally attached at one end to a motorcycle main frame and fixedly or adjustably attached to a rear wheel axle at a second end. The swingarm allows the rear wheel to travel in an arcuate motion with respect to the frame.

Tie-rod: mechanical linkages that pivotally connect a motorcycle swingarm to a relay arm.

Compression damping: resistance to rapid compression of the suspension.

Twin shock: a suspension arrangement that utilizes a pair of rear shock absorbers flanking the rear wheel.

B) Detailed Description of the Invention

Components of the airbag suspension system are represented by reference numerals that are consistent throughout FIGS. 1–7. Some aspects of the invention may be best understood by applying the following written descriptions to more than one FIG. Lines with arrowheads indicate major assemblies, or portions of such assemblies, that are further detailed in that FIG.

FIG. 1 depicts an exploded view of the airbag suspension system. A motorcycle main frame (1) having a vertical member (2) is pivotally connected to a swingarm (6). Upon removal of the stock shock absorber and associated hardware, an upper airbag mount (10) attaches at a frame attachment site (13) to the main frame vertical member (2).

A lower airbag mount (23) attaches at a swingarm attachment site (24) to a swingarm vertical member (7).

An airbag (39) is mounted between the upper airbag mount (10) and lower airbag mount (23) at an upper airbag mount airbag attachment site (11) and a lower airbag mount airbag attachment site (25), respectively.

Figure 2:
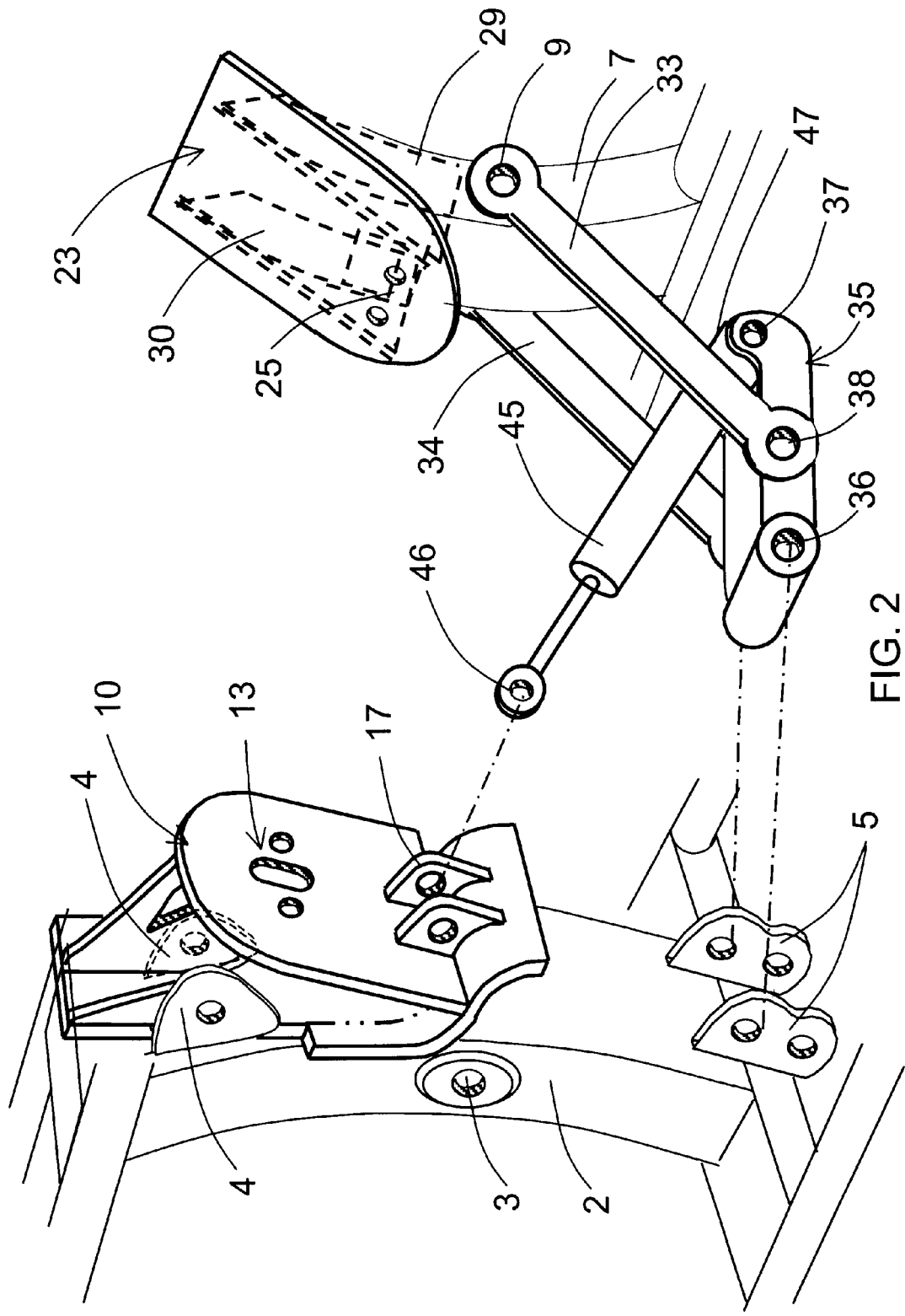
FIG. 2 shows the mounting locations of the upper and lower airbag mounts

A relay arm (35), best viewed in FIG. 2, has a main frame attachment site (36), a shock absorber attachment site (37), and at least one tie-rod attachment sites (38). The relay arm (35) is pivotally attached at its main frame attachment site (36) to the main frame relay arm attachment site (5). A shock absorber (45) is pivotally attached at a first end (46) to a shock attachment site (17) of the upper airbag mount (10) and pivotally attached at a second end (47) to the shock absorber attachment site (37) of the relay arm (35).

A left tie-rod (33) and a right tie rod (34) are pivotally attached to the tie-rod attachment sites (38) of the relay arm (35) and additionally attached to the tie-rod attachment sites (9) of the swingarm (6).

Compression of the rear suspension (e.g., when the rear wheel of a moving motorcycle strikes a bump on the road) moves the swingarm (6) upward, driving the lower airbag mount (23) toward the upper airbag mount (10), thereby compressing the airbag (39) which functions as a mechanical spring, resisting the change in motion.

The shock absorber (45) provides damping for the motion of the swingarm (6) relative to the frame (1). As the swingarm (6) rises, the tie-rods (33, 34) are drawn upward, thereby pulling the relay arm (35) in an upward direction and compressing the shock absorber (45). Because the relay arm tie-rod attachment sites (38) are closer to the main frame relay arm attachment site (36) than the shock absorber attachment site (37), the relay arm (35) amplifies the upward motion of the swingarm (6) that is translated to the shock absorber (45). In addition, as the suspension compresses, the angle between the shock absorber (45) and the relay arm (35) approaches 90°. Accordingly, the rate of shock absorber travel increases as the suspension compresses, providing progressive motion for the shock absorber (45).

FIGS. 3–6 depict a preferred embodiment of the upper airbag mount (10). The upper airbag mount (10) comprises a frame attachment site (11), an airbag attachment site (13), a shock absorber attachment site (17) with one or more shock absorber attachment site holes (18), a first plate (19), a second plate (20) with an opening (15) to accept the stock main frame shock absorber mount (4), a first vertical member (21), and a second vertical member (22). In one embodiment of the invention, the airbag attachment site (13) comprises one or more airbag attachment site holes (16), and one or more airbag inlet fitting holes (14). In another embodiment of the invention, the upper airbag mount frame attachment site holes (12) are designed to align with the stock main frame shock absorber mount (4), best viewed in FIG. 2. In another embodiment, at least part of the stock main frame shock absorber mount inserts through an upper airbag mount frame attachment site opening (15). In an alternative embodiment, the upper airbag mount (10) may attach to the main frame (1) independent of the stock main frame shock absorber mount (4).

In another alternative, the upper airbag mount may be a single plate or single vertical member provided that it may perform the functional of attaching to a main frame and supporting an end of an airbag.

In a preferred embodiment of the invention, the upper airbag mount is designed to fit a cruiser motorcycle, such as the Yamaha V-STAR®. Some of the desirable dimensions are indicated in FIG. 5.

Figure 6:
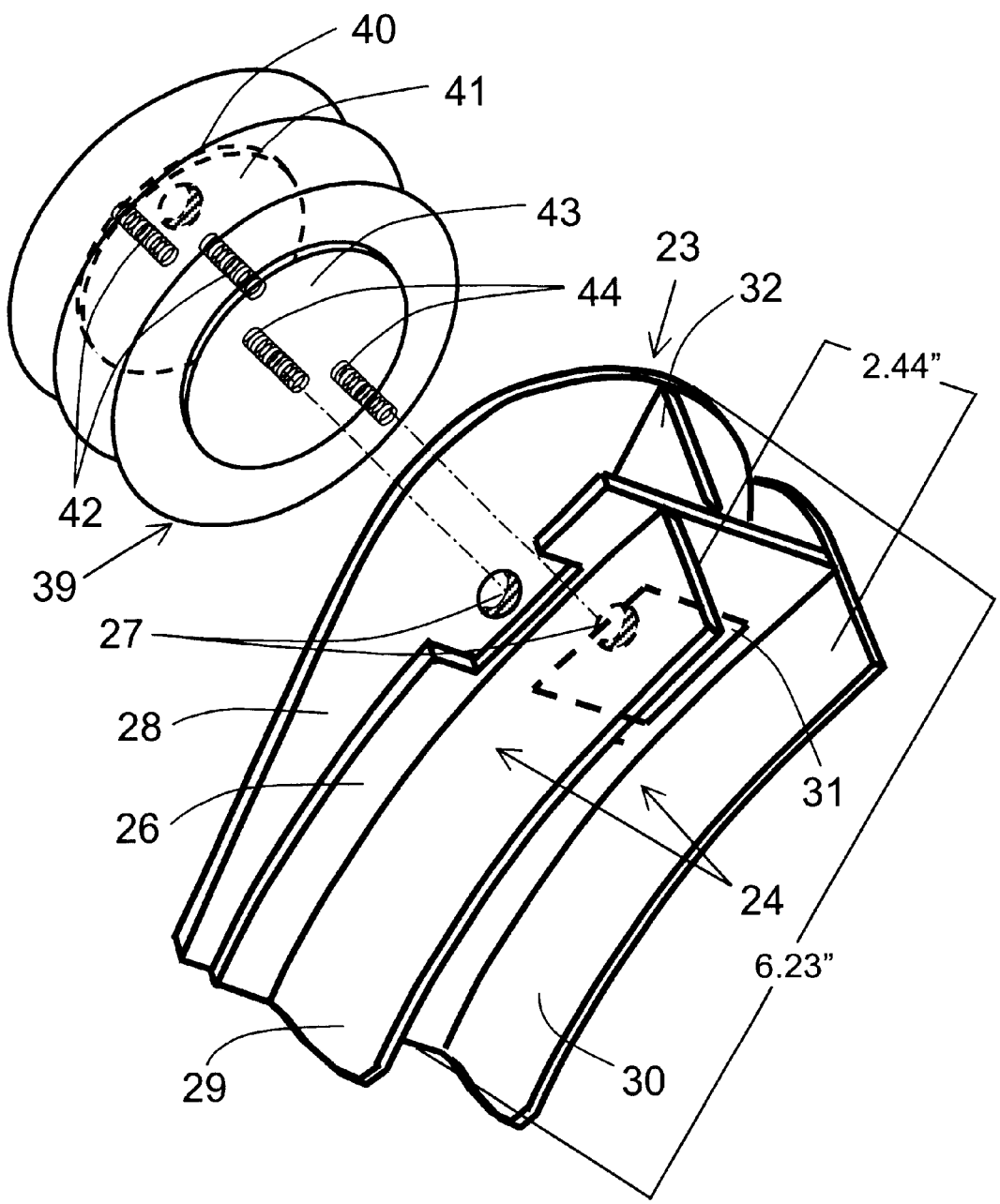
FIG. 6 depicts a preferred embodiment of the airbag and lower airbag mount (¾-view)

FIG. 6 shows a preferred embodiment of the airbag (39) and lower airbag mount (23). The airbag (39) comprises an inlet fitting (40), an upper airbag mount attachment site (41), and a lower airbag mount attachment site (43). In a preferred embodiment, the airbag is constructed, in part, of an elastopolymer. In another embodiment of the invention, the airbag further comprises airbag mount attachment site studs or, in the alternative, threaded inserts for accepting bolts (42, 44).

A preferred embodiment of the lower airbag mount (23) comprises a swingarm attachment site (24) and an airbag attachment site (25), also seen in FIG. 2. In another preferred embodiment, the lower airbag mount swingarm attachment site further comprises a central vertical member (32), an interior member (26), a first vertical member (29), and a second vertical member (30). In a preferred embodiment, the interior member (26) further comprises an access hole (31) to allow access to airbag attachment site holes (27). In a most preferred embodiment, the vertical members (29, 30) of the lower airbag mount (23) bestride the vertical member (7) of a Yamaha V-STAR® swingarm (6) with the lower airbag mount interior member (26) resting against the swingarm vertical frame member (7). In one embodiment the lower airbag mount (23) is held in location by one or more fasteners. In another embodiment, the weight of a motorcycle so equipped with the airbag suspension system of the instant invention is sufficient to maintain the position of the lower airbag mount (23) against the swingarm vertical member (7).

In an alternative embodiment of the invention, the lower airbag mount may be one or more plates or one or more vertical members provided that the lower airbag mount may perform the functional characteristic of attaching to a swingarm and supporting an end of an airbag.

In a preferred embodiment of the invention, a shock absorber (45), best seen in FIG. 2, is fitted to a motorcycle as an element of the airbag suspension system. Shock absorbers are well-known to those skilled in the art and can be built to suit almost any application. In a preferred embodiment, directed toward a Yamaha V-STAR® motorcycle, the shock absorber has a compressed length of 7" and a stroke of 3". One or more tie-rods are used to pivotally connect the swingarm (6) to the relay arm (35). In one embodiment of the invention, the stock tie-rods (33, 34) are utilized. In another embodiment, tie-rods that are adjustable in length are used.

The relay arm (35) amplifies the motion of the swingarm (6) with respect to the shock absorber (45). In one embodiment of the invention, the distance between the relay arm (35) main frame mount (36) and shock absorber mount (37) is about twice the distance between the main frame mount (36) and tie-rod mount (38), providing about a two-fold amplification of swingarm (6) motion. In a most preferred embodiment of the invention, the relay arm (35) is so positioned so as to approach an angle of about 90° with respect to the shock absorber (45) when the swingarm (6) is approaching maximum compression travel, thereby providing a progressive motion of the swingarm with respect to the shock absorber.

C) EXAMPLE

In an example of the invention, the instant motorcycle airbag suspension system was fitted to a 2000 Yamaha V-STAR® (1,100 cc) motorcycle.

An upper airbag mount (10), essentially as shown in FIGS. 3–5, was constructed from ¼" thick steel and mounted to the stock shock absorber attachment site (4) of the main frame vertical member (2) using a bolt through the upper airbag mount frame attachment site holes (12) which also passed through the stock shock absorber attachment site (4). A lower airbag mount (23), essentially as shown in FIG. 6, was constructed from 5/32" thick steel and mounted to the swingarm vertical member (7), to be held in place by the weight of the motorcycle.

A two-ply bellows airbag (39) (Firestone, Part No. 16-ST) with a maximum inflation pressure of 100 psi and a maximum compression stroke of 1.5" was attached to the upper airbag mount (10) and lower airbag mount (23) using the airbag mounting studs or threaded inserts (42, 44) supplied with the airbag (39).

A relay arm (35) was constructed by essentially duplicating the stock relay arm except that the relay arm shock absorber attachment site (37) was designed to accept a different shock absorber (45). The stock tie-rods (33, 34) were used to pivotally connect the swingarm tie-rod mounts (9) to the relay arm tie-rod attachment sites (38).

A gas charged shock absorber (45) (Pro Shock) with a compressed length of 7" and a stroke of 3" was attached to the upper airbag mount shock absorber attachment site (17) and the relay arm shock absorber attachment site (37).

An air compressor (48) (Thomas, 125-series) with a maximum pressure of 120 psi was mounted behind the stock right passenger footpeg (not shown) and an airline (49) was plumbed to the airbag (39). The compressor (48) is operated by a rocker switch mounted on the left handle bar (not shown). A solenoid valve (51) was fitted in the airline to allow pressure in the airbag to be released. The solenoid valve (51) is also controlled by a rocker switch assembly mounted on the left handle bar.

The airbag suspension system provided about 3" of ride height adjustment by varying the air pressure in the system from 0–100 psi (gauge). Air pressure could be increased from 0 psi to 100 psi in about 5 seconds by operating the compressor (48) from the handlebar-mounted rocker switch or decreased from 100 psi to 0 psi in about 0.5 second by operating the solenoid valve (51) from the handlebar-mounted rocker switch.

The addition to the system of an air pressure reservoir (50), e.g., a compressed air cylinder, will allow the pressure in the airbag to be increased even more rapidly. In this case, rather than pressurizing the airbag (39) directly from the air compressor (48), the airbag is pressured by opening a second solenoid valve (51) that allows air to flow from the pressurized reservoir (50) to the airbag (39). An air pressure sensor (not shown) is functionally connected to the pressure reservoir to monitor the pressure in the reservoir and control the air compressor to maintain a preset reservoir pressure of, for example, about 100–120 psi.

The disclosure of each publication, patent, and patent application cited above is hereby incorporated by reference in its entirety.

The use of additional components, including but not limited to, bushings, bearings, fasteners, and lubricants, is well know to those skilled in the art. The use of appropriate air compressors, air lines, air fittings, solenoid valves, switches, electrical connections, and other components necessary for but peripheral to the instant invention is also well know to those skilled in the art.

Those skilled in the art will understand that the invention is in no way limited to the above example. The invention encompasses all reasonable variations and equivalents that will become apparent to those skilled in the art based on the above teachings related to the disclosed invention.

What is claimed is:

1. An airbag suspension system for a motorcycle, the motorcycle having a main frame and a swingarm-mounted rear wheel, the airbag suspension system comprising:
   a) an upper airbag mount having a main frame attachment site, an upper airbag attachment site, and a shock mounting site, said upper airbag mount being attached to said main frame at said main frame attachment site,
   b) a lower airbag mount having a swingarm attachment site and a lower airbag attachment site, said lower airbag mount being attached to said swingarm at said swingarm attachment site,
   c) an inflatable airbag having a longitudinal axis along which said airbag changes length upon inflation, and having an airbag mount attachment site at each end of the longitudinal axis, said airbag being attached to said upper airbag attachment site and said lower airbag attachment site;
   d) a relay arm having a main frame attachment site at a first end, a shock absorber attachment site at a second end, and a tie-rod attachment site between said first and second ends, said relay arm being pivotally attached to a relay arm mounting site on said main frame,
   e) said relay arm additionally pivotally attached at said shock absorber attachment site to a first end of a shock absorber,
   f) a second end of said shock absorber being pivotally attached to said upper airbag mount shock mounting site,
   g) said relay arm being additionally pivotally attached at said tie-rod attachment site to a first end of at least one tie-rod,
   h) a second end of said tie-rod being pivotally attached to a tie-rod mounting site on said swingarm.

2. The system of claim 1 wherein said upper airbag mount is fixedly attached to said main frame at said main frame attachment site.

3. The system of claim 1 wherein said lower airbag mount is fixedly attached to said swingarm at said swingarm attachment site.

4. The system of claim 1 wherein the upper airbag mount frame attachment site comprises multiple frame attachment sites.

5. The system of claim 1 wherein the lower airbag mount frame attachment site comprises multiple swingarm attachment sites.

6. The system of claim 1 comprising two tie-rods disposed in an essentially parallel manner.

7. The system of claim 1 wherein the relay arm is oriented so as to translate constant upward angular swingarn motion into progressively increasing shock absorber compression motion.

8. The system of claim 1 wherein the relay arm provides a progressive shock linkage.

9. The system in claim 1 where the shock absorber is a coil-over spring shock absorber.

10. The system in claim 1 where the shock absorber is externally adjustable.

11. The system of claim 1 wherein at least one airbag attachment site provides an adjustment to set a baseline ride height.

12. The system of claim 1 further comprising an air compressor functionally connected to said airbag.

13. The system of claim 12 wherein said air compressor is additionally functionally connected to an electrical charging system, said electrical charging system and said airbag system being elements of a single motorcycle, and where said air compressor can be operated by an operator of said motorcycle while said motorcycle is stationary or in motion.

14. The system of claim 13 additionally comprising a means of releasing pressure from the airbag system while the motorcycle is stationary or in motion.

15. The system of claim 14 wherein the means of releasing pressure from the airbag system is a solenoid valve.

16. The system of claim 15 further comprising a consolidated switch assembly that allows the operator to increase and decrease air pressure to the airbag suspension system using said consolidated switch assembly.

17. The System of claim 16 wherein the consolidated switch assembly is handlebar-mounted.

18. The System of claim 16 wherein the consolidated switch assembly is dashboard-mounted.

19. The system of claim 16 further comprising an air pressure gauge functionally connected to the airbag suspension system.

20. The system of claim 16 further comprising a microprocessor.

21. The system of claim 12 further comprising a pressure reservoir and a solenoid valve functionally connected between said compressor and said airbag, wherein air pressure in said airbag is regulated by operation of the solenoid valve.

* * * * *